US012737983B2

(12) United States Patent
Mukherjee

(10) Patent No.: US 12,737,983 B2
(45) Date of Patent: Sep. 15, 2026

(54) CONSTRAINT-DRIVEN IMPRINT-BASED MESH GENERATION FOR COMPUTER-AIDED DESIGN (CAD) OBJECTS

(71) Applicant: Siemens Industry Software Inc., Plano, TX (US)

(72) Inventor: Nilanjan Mukherjee, Cincinnati, OH (US)

(73) Assignee: Siemens Industry Software Inc., Plano, TX (US)

( * ) Notice: Subject to any disclaimer, the term of this patent is extended or adjusted under 35 U.S.C. 154(b) by 166 days.

(21) Appl. No.: 18/711,305

(22) PCT Filed: Dec. 9, 2021

(86) PCT No.: PCT/US2021/062588

§ 371 (c)(1),
(2) Date: May 17, 2024

(87) PCT Pub. No.: WO2023/107113

PCT Pub. Date: Jun. 15, 2023

(65) Prior Publication Data

US 2025/0022225 A1 Jan. 16, 2025

(51) Int. Cl.
*G06T 17/20* (2006.01)

(52) U.S. Cl.
CPC .................................... *G06T 17/20* (2013.01)

(58) Field of Classification Search
CPC . G06T 17/20; G06T 19/20; G06T 2219/2021; G06F 30/23
See application file for complete search history.

(56) References Cited

U.S. PATENT DOCUMENTS

| | | | | |
|---|---|---|---|---|
| 5,315,537 | A | 5/1994 | Blacker | |
| 5,446,801 | A | 8/1995 | Itsuzaki et al. | |
| 2017/0061037 | A1* | 3/2017 | Makem | G06F 30/23 |
| 2018/0247004 | A1* | 8/2018 | Allen | G06F 30/23 |
| 2021/0056174 | A1 | 2/2021 | Zhao et al. | |
| 2021/0327139 | A1 | 10/2021 | Mukherjee | |
| 2022/0067241 | A1* | 3/2022 | Scott | G06F 30/23 |

OTHER PUBLICATIONS

David R. White et al: "An imprint and merge algorithm incorporating geometric tolerances for conformal meshing of misaligned assemblies", International Journal of Numerical Methods in Engineering, Chichester, GB, vol. 59, No. 14, Mar. 16, 2004 (Mar. 16, 2004), pp. 1839-1860, XP071315772, ISSN: 0029-5981, DOI: 10.1002/NME.937.

* cited by examiner

*Primary Examiner* — Michelle Chin

(57) ABSTRACT

A computing system may include a computer-aided design (CAD) face access engine configured to access a CAD object and an imprint-based meshing engine configured to define an imprint region for a face of the CAD object and determine that the imprint region meets constraint criteria. Responsive to a determination that the imprint region meets the constraint criteria, the imprint-based meshing engine may modify the imprint region into an adapted imprint region and generate an output mesh using the adapted imprint region.

18 Claims, 11 Drawing Sheets

Adapted Imprint Region 620
Imprint Region 610

CONSTRAINT-DRIVEN IMPRINT-BASED MESH GENERATION FOR COMPUTER-AIDED DESIGN (CAD) OBJECTS

BACKGROUND

Computer systems can be used to create, use, and manage data for products, items, and other objects. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate the design, visualization, and simulated testing of product structures and product manufacture.

BRIEF DESCRIPTION OF THE DRAWINGS

Certain examples are described in the following detailed description and in reference to the drawings.

DETAILED DESCRIPTION

Figure 1:
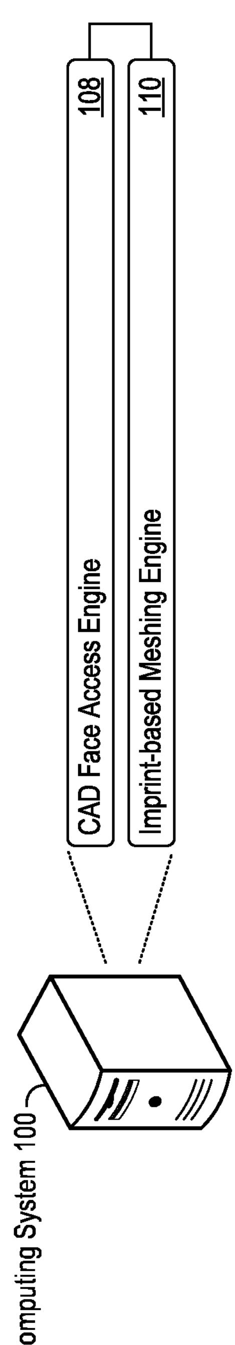
FIG. 1 shows an example of a computing system that supports constraint-driven imprint-based mesh generation.

With technological advancements in CAD computing systems, the capabilities of CAD-based design, simulation, and processing of CAD models are increasing as well. Complex simulations can be performed to test nearly any aspect, characteristic, or behavior of CAD objects that digitally model physical products. CAE systems may, for example, provide finite element analysis (FEA)-based simulation suites that can implement complex and robust simulation features for a vast variety of tests on nearly any type of product. Example simulation scenarios supported by modern CAE systems range from thermal simulations of gas turbine components, to pressure measurements for composite ply-layup procedures, to complex fluid dynamics simulations, to detailed impact simulations of car parts in vehicular crashes, and many more.

FEA simulation suites typically rely on an underlying mesh to drive simulation capabilities. A mesh may be comprised of mesh elements that together cover the surface (or volume) of a CAD model, forming the mesh. Mesh elements may have various characteristics, shapes, and parameters, with specific mesh element attributes depending on the meshing process used to generate the mesh. For instance, mesh elements can be triangular, quadrilateral, or hexahedral in shape, as but a few examples. As used herein, meshing may refer to any process, procedure, computation, or flow that generates a mesh. Modern meshing technologies have continued to increase in complexity, and mesh model preparation processes have become increasingly specialized. Geometry preparation and simplification for meshing and mesh generation technologies have faced challenges with scalability and variability. In a similar manner that geometric representations cannot be over-simplified without impacting FEA simulation accuracy, a single surface meshing algorithm may be insufficient to satisfy analysis accuracy demands across a variety of types of object models and simulation scenarios.

Various types of structural analysis and other FEA simulations for 3D models require high-quality meshes to accurately analyze a CAD model. Mesh quality may be measured through any number of quantifiable measures, and any suitable measure of mesh quality is contemplated herein. As an example need for high-quality meshes, stress analyses in 3D models often analyze deflections, cracking, and stress points at specific (e.g., critical) regions of a 3D object, for example at holes, nut and bolt locations, sheet cut outs, etc. Having high quality mesh elements at such locations may be imperative to ensure proper structural analyses.

As another example, collision analyses in the automotive industry may be performed on a discretized finite element mesh model of the entire car assembly, especially through what is called the body-in-white (BIW). In the automotive industry, BIW may refer to the fabricated (usually seam and/or tack welded) sheet-metal components that form the body of a car. As such, BIW models may represent a stage of the car body prior to painting and before the moving parts (doors, hoods, fenders etc.), the engine, chassis sub-assemblies, and trim (glass, seats, upholstery, electronics, etc.) have been mounted. Structured and regular quadrilateral-dominant meshes (with the majority face interior nodes connected to four elements, e.g., possess a valency of 4) can be created to represent BIW body panels for testing car behavior through a variety of finite element analyses and simulations.

Collision analyses on such BIW models is usually a nonlinear, transient dynamic structural analysis for a mesh under shock and/or impact loading. Such detailed analyses can be performed in order to predict the stress, deflection and rupture of the automobile in a crash situation. For results and predictions to be accurate, collision analyses may require the finite element mesh to have many distinct characteristics, namely, high-quality structured mesh elements for BIW features and around bolt holes. Generation of such high-quality structured meshes, especially at critical locations of a CAD object, can be challenging. Conventional meshing algorithms uniformly applied across an entire CAD object may be incapable of generating mesh elements of sufficient quality at critical regions of the CAD model, and such-generated meshes may often be insufficient for FEA processes to test a 3D object with the required accuracy.

Some techniques exist to alter the geometry of the CAD object itself, introducing additional geometric faces that directly represent critical regions of a CAD model. Geometry operators of a geometry engine can alter the geometry of a CAD model for the purpose of mesh generation. For instance, CAD-oriented geometry operations can splice or insert geometric faces into a CAD object to represent a critical region or other region-of-interest. However, such geometry alteration-based meshing techniques are hindered by various limitations and challenges. As an example limitation, representation of critical regions through CAD geometry (e.g., a CAD face) requires dimension-fitting to a specific mesh element size. That way, the inserted geometric face can align with mesh element boundaries in an attempt to smooth mesh transitions between the faces of the CAD object. Any resizing of mesh elements (e.g., to a different mesh dimension, area, or granularity) may require a complete redesign of the geometry faces used to represent critical regions, resulting in excess computations, latency, and resource requirements for even minimal mesh changes.

Mesh generation (also referred to as meshing) can be a complex process that requires multiple iterations or generation of multiple candidate mesh models to identify high-quality meshes. Various features of imprint-based mesh generation technology are described in international patent application no. PCT/US2021/037651 ("the '651 application"), titled "Imprint-Based Mesh Generation for Computer-Aided Design (CAD) Objections" and filed on Jun. 16, 2021, the contents of which are incorporated herein by reference in its entirety. As described in the '651 application, imprint-based meshing technology can provide capabilities to imprint shapes on to faces of CAD models and treat such imprinted shapes as distinct meshing zones within the same CAD face. By decomposing a single CAD face into multiple regions (e.g., multiple virtual faces), the imprint-based meshing technology of the '651 application may allow for customizable meshing at critical regions of a CAD face, for example using meshing parameters to generate finer-sized mesh elements or mesh elements of higher quality than those meshed at other non-critical regions. Such imprint-based meshing may be possible without altering the actual geometry of a CAD object, as such geometric operations can incur significant computational costs as compared to local imprinting and zoning of CAD faces of the described imprint-based meshing technology.

The present disclosure may likewise provide the imprint-based meshing capabilities described in the '651 application, and thus likewise render the tangible technical improvements and technical benefits of imprint-based meshing as compared to conventional technologies. Moreover, the present disclosure may provide systems, methods, devices, and logic for constraint-driven imprint-based mesh generation. As described herein, certain scenarios may exist in which the geometry or characteristics of CAD faces, defined imprint regions, or other aspects of a CAD model may constrain the overall effectiveness of imprint-based mesh generation. The constraint-driven imprint-based mesh generation technology of the present disclosure may address these specific scenarios, providing for intelligent processing and increased mesh quality for specific CAD faces, geometry, or aspects with constraints that limit the effectiveness of the various imprint-based meshing processes as described in the '651 application.

In particular, the constraint-driven imprint-based mesh generation technology of the present disclosure may address various constraints on imprint-based meshing of CAD models, including when a defined imprint region encloses a circular edge that is connected to another face of the CAD object (e.g., static holes that cannot be rotated), when a portion of a defined imprint region is outside a boundary of a face of the CAD object, when a defined imprint region overlaps with a different imprint region defined for the face of the CAD object, when a mesh direction determined for a face of the CAD object is designated as unreliable, or any combination thereof. The constraint-driven imprint-based mesh generation features described herein may address each of these various constraints, allowing for the generation of meshes of increased mesh quality and increased suitability for FEA simulations, product validations and analyses, and adaptations for any other specific technical fields.

These and other features of the constraint-driven imprint-based meshing technology and the technical benefits of the present disclosure are described in greater detail herein.

FIG. 1 shows an example of a computing system 100 that supports constraint-driven imprint-based mesh generation. The computing system 100 may take the form of a single or multiple computing devices such as application servers, compute nodes, desktop or laptop computers, smart phones or other mobile devices, tablet devices, embedded controllers, and more. In some implementations, the computing system 100 hosts, supports, executes, or implements a CAD application that provides any combination of mesh generation and processing capabilities.

As an example implementation to support any combination of the imprint-based meshing features described herein, the computing system 100 shown in FIG. 1 includes a CAD face access engine 108 and an imprint-based meshing engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the CAD face access engine 108 may access a CAD object, for example by loading or opening a 3D model or any other CAD file or 3D design. In operation, the imprint-based meshing engine 110 may define an imprint region for a face of the CAD object and determine that the imprint region meets constraint criteria. The constraint criteria may define specific constraints that the imprint-based meshing engine 110 may specifically address in support of imprint-based mesh generations. As examples, the constraint criteria may be met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof.

Responsive to a determination that the imprint region meets the constraint criteria, the imprint-based meshing engine 110 may modify the imprint region into an adapted imprint region and generate an output mesh using the adapted imprint region. In doing so, the imprint-based meshing engine 110 may implement or provide any imprint-based meshing capability described in the '651 application. For example, the imprint-based meshing engine 110 may generate the output mesh by decomposing the face of the CAD object into virtual faces, including an imprinted virtual face that covers the adapted imprint region and a remainder virtual face that covers a remainder portion of the face outside of the adapted imprint region, meshing the imprinted virtual face to form an imprint region mesh and meshing the remainder virtual face to form a remainder region mesh, and merging the imprint region mesh and the remainder region mesh together to form the output mesh.

These and other constraint-driven imprint-based meshing features and technical benefits are described in greater detail next. Many of the examples presented herein use shape imprinting onto a 2D parameter space of a CAD face as an illustrative example (and 2D imprinting, decomposing, and/or meshing can then be transformed into a 3D model). However, the present disclosure is not so limited, and any of the constraint-driven imprint-based meshing technology may be consistently implemented directly for 3D faces of a CAD object.

The constraint-driven imprint-based meshing technology presented herein may be implemented as part of or local to the meshing capability of a CAD application, and as such may be implemented as part of the design and architecture of a meshing component of a CAD application to support shape imprinting on CAD faces. In that regard, the constraint-driven imprint-based meshing technology may subdivide or partition a CAD face into multiple zones (also referred to as virtual faces) by imprinting shapes onto the CAD face that define the different regions to mesh in a CAD face. Specific constraints that can limit the effectiveness of mesh generation may be addressed by modifying imprint regions into adapted print regions or adapting meshing processes to address the specific constraints. Many examples of the present disclosure are presented using the imprint-based meshing engine 110 as an illustrative implementation. However, any viable implementation of the constraint-driven imprint-based meshing technology is contemplated herein.

Various examples of constraints that the imprint-based meshing engine 110 may address via the constraint-driven imprint-based meshing technology of the present disclosure are described herein. As one example, a constraint may be identified in a CAD object as a static hole that cannot be rotated. Example features of addressing such static hole constraints are described in greater detail next with reference to FIG. 2

Figure 2:
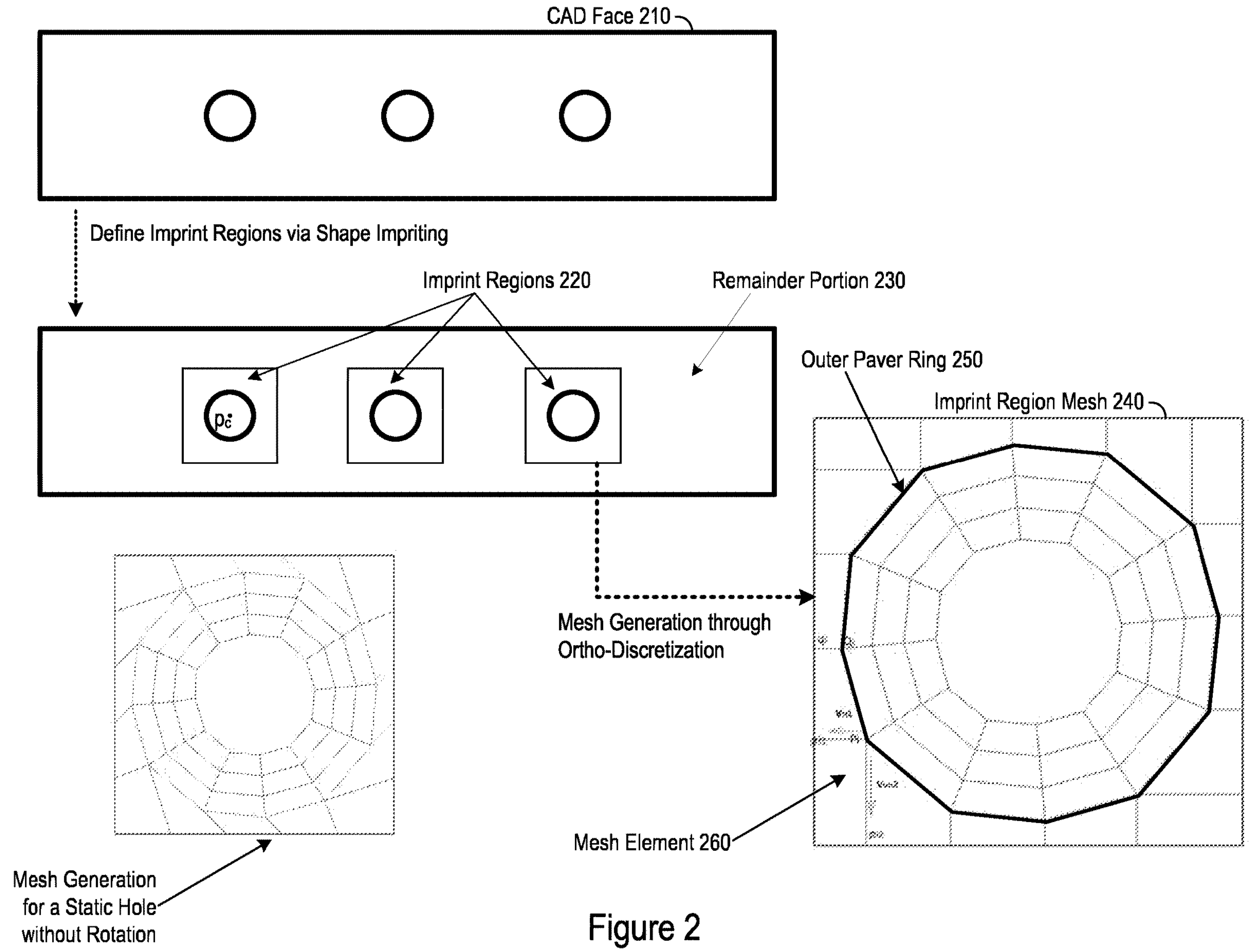
FIG. 2 shows an example of addressing a static hole constraint via the constraint-driven imprint-based meshing technology of the present disclosure.

FIG. 2 shows an example of addressing a static hole constraint via the constraint-driven imprint-based meshing technology of the present disclosure. In the example of FIG. 2, the imprint-based mesh engine 110 may identify a CAD face 210 as a face-of-interest of a CAD object (e.g., via user selection) and imprint three (3) box shapes around holes of the CAD face 210. By imprinting the box shapes onto the CAD face 210, the imprint-based meshing engine 110 may define imprint regions 220, e.g., in a consistent manner as described in the '651 application. And by defining the imprint regions 220 via shape imprinting, the imprint-based meshing engine 110 may (at least implicitly) define a remainder portion 230 as well, which may include any portion of the CAD face 210 that is not part any imprint region defined by shapes imprinted on to the CAD face 210.

At any point before, during, or after defining the imprint regions 220, the imprint-based meshing engine 110 may determine that the CAD face 210 or a defined imprint region 220 meets constraint criteria, such as a static hole constraint. A static hole may refer to a hole (e.g., circular edge or interior loop of a CAD face) that is connected to another face of the CAD object. Put another way, a static hole constraint may exist when the circular edge that forms a hole in a CAD face is not a "free" edge because it is connected to multiple geometric faces of a CAD object. An example of such a hole constraint may exist in a CAD object that includes a sheet face with a hole, and a cylindrical volume is attached to the hole on the sheet face. In this example, the hole in the sheet face is not a "free" edge as it is attached to another CAD face in the CAD object.

The imprint-based meshing engine 110 may determine that constraint criteria are met when an imprint region 220 of the CAD face 210 encloses a circular edge that is connected to another face of the CAD object. Static hole constraints may reduce the effectiveness of imprint-based meshing techniques by limiting the ability of a hole or circular edge in a CAD face to be rotated in order to properly generate an imprint region mesh that surrounds the holes. In the '651 application, imprint-based mesh generation technology may support orientation (e.g., rotation) of template mesh elements by a computed angle to ensure certain mesh elements of paver rings and a printed box shape align with the mesh direction (also referred to as mesh flow direction) determined for the CAD face. Such alignment and orientation may provide a desired flowability in a generated mesh, which may be particularly relevant for crash analyses of automotive body-in-white panels that can require a dominantly uninterrupted parallel mesh flow in the complimentary directions of a crash direction.

The box rotation of the '651 application may be possible when the hole of the CAD face is a "free" edge, but such rotation techniques may be limited or unavailable for static holes included in the CAD face 210. Without rotation or orientation of a box-with-hole imprinted shape, a generated mesh inside the box-with-hole virtual face can become distorted when these holes are not rotated to align with the mesh direction of the CAD face 210. FIG. 2 shows an example of a box-with-hole virtual face and mesh generation when a static hole is not rotated and a static hole constraint is unaddressed In the example of FIG. 2, the box-with-hole virtual face may be meshed via specified parameters, in particular via twelve (12) paver elements that surround the hole (N=12) and three (3) layers quads of uniform thickness that form the paver rings. These or any other suitable meshing parameters or templates may be user-selected or otherwise determined by the imprint-based meshing engine 110. In some implementations, the imprint-based meshing engine 110 may mesh margin between the paved layers and the box boundary with a template, and template may require five (5) divisions or element counts on each of the boundaries of the imprinted virtual face defined by the imprint region 220. As seen in FIG. 2, the basic (unsmoothed) mesh for such a templated meshing of a static hole is distorted. None of the quad elements in the example shown in FIG. 2 have a single right angle, and low-quality meshes may be unacceptable for proper vehicle collision analyses.

To address a static hole constraint, the imprint-based meshing engine 110 may discretize the boundaries of an imprint region that surrounds a static hole through orthogonal projections. Such a process may be referred to as ortho-discretization. Ortho-discretization may involve the projection of a certain target point onto an edge in orthogonal directions, and the imprint-based meshing engine 110 may perform ortho-discretization for points of an outer paver ring of an imprint mesh region to the boundaries of the imprint mesh region (e.g., the boundary of the imprinted virtual face that defines the imprint mesh region). Thus, when the imprint region 220 meets the constraint criteria for when the imprint region 220 encloses a circular edge that is connected to another face of the CAD object (e.g., a static hole constraint), the imprint-based meshing engine 110 need not change the imprint region 220 itself, but instead perform ortho-discretization on the imprint region 220. Expressed in another way, the imprint-based meshing engine 110 may modify the imprint region 220 into the adapted imprint region by doing so without any change. That is, the imprint-based meshing engine 110 may use the imprint region 220 as the adapted imprint region and define an imprinted virtual face bounded by the imprint region 220.

Then, the imprint-based meshing engine 110 may mesh the imprinted virtual face to form an imprint region mesh 240 by generating a boundary ring of the imprint region mesh via projecting points of an outer paver ring of the imprint region mesh to orthogonally intersect boundaries of the imprinted virtual face. Through such projections, the imprint-based meshing engine 110 may form mesh elements of the boundary ring of the imprint region mesh. An example application of ortho-discretization according to the present disclosure is shown in FIG. 2 in which the imprint-based meshing engine 110 generates the imprint region mesh 240.

The imprint region mesh 240 shown in FIG. 2 includes an outer paver ring 250 comprised of twelve (12) mesh elements, and the points at which edges of the outer paver ring 250 meet may be referred to or understood as nodes of the outer paver ring 250. The outer paver ring 250 constructed by the imprint-based meshing engine 110 (e.g., via template) may include twelve (12) nodes, including four (4) corner nodes that can be identified as being the nodes of the outer paver ring 250 closest in distance to a respective corner of the imprinted box shape, which may then form an imprinted virtual face.

In the example of FIG. 2, the imprint-based meshing engine 110 may generate mesh elements of the boundary ring of the imprint region mesh 240 formed between the outer paver ring 250 and boundary of the box-shaped imprinted virtual face via ortho-discretization. In doing so, the imprint-based meshing engine 110 may project each of the nodes of the outer paver ring 250 orthogonally to a closest boundary (e.g., edge) of the imprinted virtual face. For the four (4) corner nodes identified for the outer paver ring 250, the imprint-based meshing engine 110 may orthogonally project the corner nodes to the two closest boundaries of the imprinted virtual face. These orthogonal projections may form the edges of mesh elements of a boundary ring of the imprint region mesh 240. As seen in FIG. 2, a mesh element 260 of the boundary ring of the imprint region mesh 240 is defined by orthogonally projecting a lower-left corner node of the outer paver ring 250 to the two closest boundaries of the imprinted virtual face that defines the imprint region mesh 240.

In some implementations, the imprint-based meshing engine 110 may perform ortho-discretization to mesh an imprint region that encloses a static hole via the following formulas:

$$q_i'(e_c) = \prod (Q_i(e_c), v_n) \forall i(N-4)$$

-continued $$p_{i1}'(e_{c1}) = \prod (P_i(e_{c1}), v_{n1}) \forall i(\text{corner})$$

$$p_{i2}'(e_{c2}) = \prod (P_i(e_{c2}), v_{n2}) \forall i(\text{corner}))$$

In this example, $e_c$ may refer to a closest boundary edge of the imprinted virtual face defined by an imprint region, N may refer to a number of mesh element edges that surround a static hole (e.g., that surround a circular edge), $$q_i'$$

may refer to the $i^{th}$ orthogonal projection of a non-corner node to the closest boundary of the imprinted virtual face, $Q_i$ may refer to the $i^{th}$ non-corner node on outer paver ring, $$p_{i1}'$$

may refer to the $i^{th}$ orthogonal projection from a corner node onto a first closest boundary of the imprinted virtual face, $$p_{i2}'$$

may refer to the $i^{th}$ orthogonal projection from a corner node onto a second closest boundary of the imprinted virtual face, $P_i$ may refer to the $i^{th}$ corner node on the outer paver ring, and $v_n$, $v_{n1}$, $v_{n2}$ may refer to the orthogonal (e.g., normal) vector(s) from the nodes to the boundary of the of the imprinted virtual face. Accordingly, the projections (e.g., vectors, lines, or any form of connection) from the nodes of the outer paver ring that orthogonally intersect with the boundary of the imprinted virtual face may form the edges of mesh elements of the boundary ring of the imprint mesh region.

In any of the ways described herein, the imprint-based meshing engine 110 may address static hole constraints in a CAD face. Through ortho-discretization, the imprint-based meshing engine 110 may generate imprint region meshes of increased quality, even for static holes that cannot be rotated or aligned to the mesh direction of a CAD face. Through addressing static hole constraints, the constraint-driven imprint-based mesh generation technology of the present disclosure may support generation of meshes that are increasingly suitable for accurate simulation and analysis, and may thus provide tangible and discrete technical benefits adapted to specific technical fields. Use of ortho-discretization and point projection techniques on box-shaped imprinted virtual face boundaries can create high-quality mesh templates on static holes via such techniques. The resultant quad elements (or any other mesh element type) on the boundary layer of the imprint region mesh can all have at least two right angles, thus increasing mesh quality as needed in support for vehicular collision analyses, complex FEA simulations, or adaptation for any specific technical field.

As another example of constraints in CAD faces, the constraint-driven imprint-based mesh generation technology of the present disclosure may address defined imprint regions that extend beyond the boundary of a CAD face. Such a constraint may be referred to as extended imprint region constraint, and example features of addressing extended imprint region constraints are described in greater detail next with reference to FIG. 3.

Figure 3:
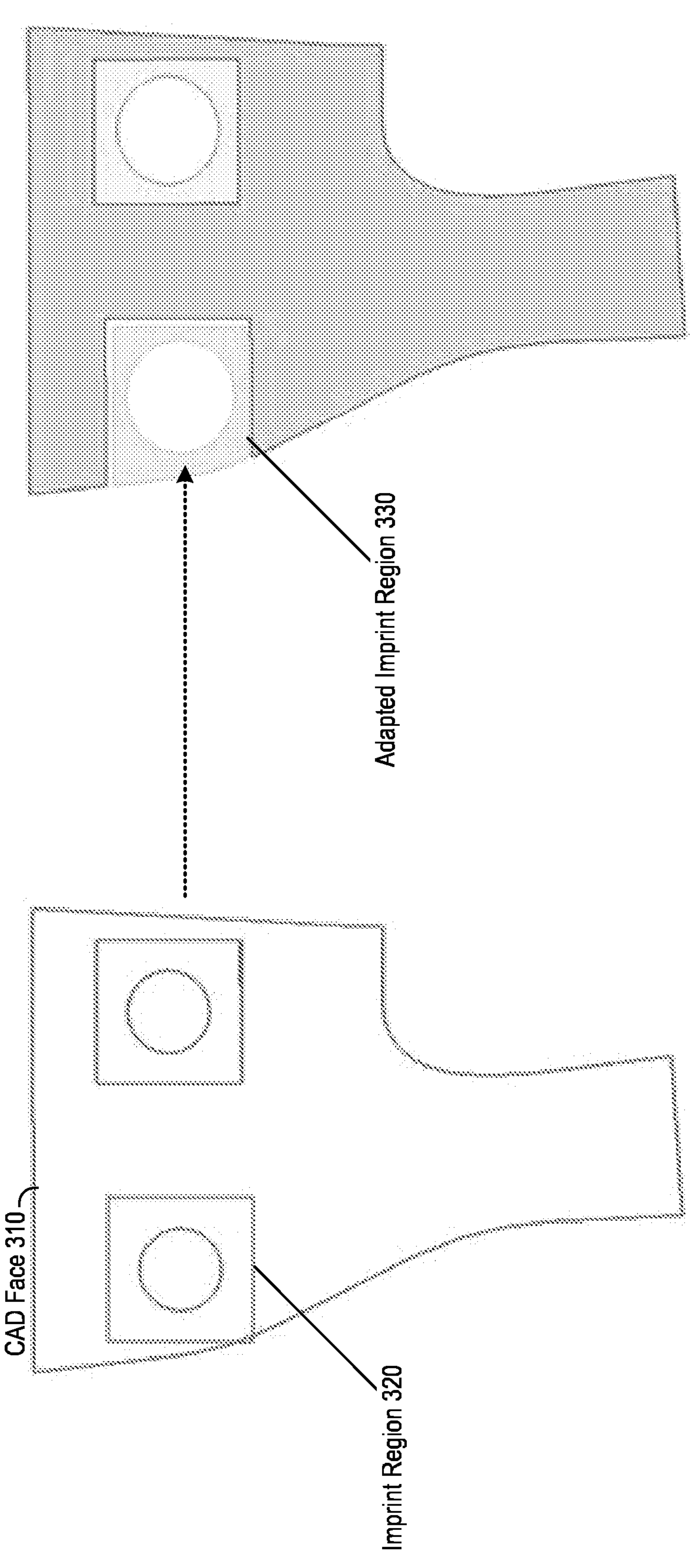
FIG. 3 shows an example of imprint region truncation that an imprint-based meshing engine may perform to address extended imprint region constraints.

FIG. 3 shows an example of imprint region truncation that the imprint-based meshing engine 110 may perform to address extended imprint region constraints. In the example of FIG. 3, the imprint-based meshing engine 110 defines imprint regions for a CAD face 310. The CAD face 310 may include an exterior boundary defined via outer edges or outer loop of the CAD face 310. The CAD face 310 also includes internal features shown as two holes, e.g., interior circular edges that define the holes of the CAD face 310. In support of imprint-based mesh generation, the imprint-based meshing engine 110 may define imprint regions as a box-with-hole type, e.g., in any of the ways described in the '651 application, including the imprint region 320 shown in FIG. 3.

The imprint-based meshing engine 110 may identify an extended imprint region constraint for the CAD face 310, doing so by determining that the imprint region 320 defined for the CAD face 310 meets constraint criteria in which a portion of the imprint region 320 is outside a boundary of the CAD face 310. Responsive to such a determination, the imprint-based meshing engine 110 may modify the imprint region 320 into an adapted imprint region in order to order to address the extended imprint region constraint. Modifying the imprint region 320 to form an adapted imprint region may include truncating the imprint region 320 along the boundary of the CAD face 310, e.g., doing so such that the extended portion of the imprint region 320 is trimmed along the boundary of the CAD face 310 and no longer extends beyond the boundary of the CAD face 310. An example of an adapted imprint region modified to address an extended imprint region constraint is shown in FIG. 3 as the adapted imprint region 330.

In some implementations, truncation of an imprint region by the imprint-based meshing engine 110 to form an adapted imprint region may include supplementing the imprint region with added portions, e.g., along a boundary of the CAD face 310 with a goal of improving mesh quality. Such an example is shown in FIG. 3 in which the adapted imprint region 320 includes added portions along a left-side boundary of the CAD face 310 such that the entire left-side boundary of the adapted imprint region 320 is comprised of (e.g., runs along) the boundary of the CAD face 310. Doing so may improve mesh quality be ensuring that no small or jagged remainder portions exist between the adapted imprint region 330 and boundary of the CAD face 310, which may have sharp angles resulting in low quality mesh elements or dimensions that would violate minimum mesh element length parameters required for output meshes.

In performing a truncation of an imprint region, the imprint-based meshing engine 110 may determine intersection points between a defined imprint region and an outer boundary of a CAD face, create virtual vertices at the intersection points, split the edges of the imprint region based on the virtual vertices, and build the truncated imprint region from the split edges along the virtual vertices (and thus truncating the portion of the defined imprint region outside of the boundary of the CAD face). The truncated imprint region may thus include at least a portion along the boundary of the CAD face. Such a truncated imprint region may require further evaluation prior to being output as an adapted imprint region for the imprint region.

For instance, imprint-based meshing engine 110 may truncate an imprint region to address extended imprint region constraints according to any number of truncation parameters applied for determined intersection points and dimensions or geometry of a truncated imprint region. Such truncation parameters may govern when, and to what extent, the imprint-based meshing engine 110 may determine to truncate portions of an imprint region, supplement the imprint region with added portions of a CAD face, or determine to drop the imprint region entirely.

As an illustrative example, the truncation parameters may dictate that the imprint-based engine 110 determines to supplement the imprint region with added portions of the CAD face when a distance between intersection points along which to truncate the imprint box is less than a minimum mesh element dimension size, if the intersection angle between the imprint region and the CAD face boundary is less than a threshold amount, or a combination of both. Responsive to meeting such criteria set by the truncation parameters, the imprint-based meshing engine 110 may supplement the imprint region by, for example, extending the dimension of the imprint region along one of the imprint region boundaries to intersect with the boundary of the CAD face. Such an example is shown in the adapted imprint region 320 in which the imprint-based meshing engine 110 extends the upper boundary along a –X direction (leftwards) until intersecting with boundary of the CAD face 310.

The minimum dimension size truncation parameter may address situations in which the boundary of the CAD face along which the imprint region will be truncated cannot satisfy the dimension requirements of a mesh element, as this boundary will form, at minimum, one side of a mesh element. Thus, extending the imprint region to include additional overlap of the boundary of the CAD face will increase the length of the intersection length, allowing for proper meshing of the adapted imprint region. The intersection angle truncation parameter may reduce or eliminate sharp angles, so as improve the quality of mesh elements formed via the adapted imprint region. Extending the imprint region to include additional overlap of the boundary of the CAD face can ensure that a sharp angle does not occur at jagged intersection points allowing for a smoother boundary subsequently bounded at another portion more ideal for mesh generation.

In some instances, the truncation parameters may specify to drop (e.g., remove or deleted) the imprint region such that no imprinted virtual face is generated from the dropped imprint region. The truncation parameters may specify such a dropping of the imprint region if no suitable adapted imprint region can be modified from the defined imprint region, and such suitability may be defined via the truncation parameters. Examples of such suitability truncation parameters include if a difference in length between two of the edges of the modified imprint region exceeds a predetermined difference threshold, if the angles between virtual vertices or intersection points differ by more than a threshold amount from a reference value (e.g., more than 50° difference from an orthogonal/90° angle), or any other configurable or suitable truncation parameters to measure suitability of adapted imprint regions.

In any such ways, the imprint-based meshing engine 110 may address extended imprint region constraints identified for a CAD face, doing so via any of the truncation features described herein. Using the adapted imprint region (e.g., the adapted imprint region 320 of FIG. 3), the imprint-based meshing engine 110 may generate an output mesh.

Figure 4:
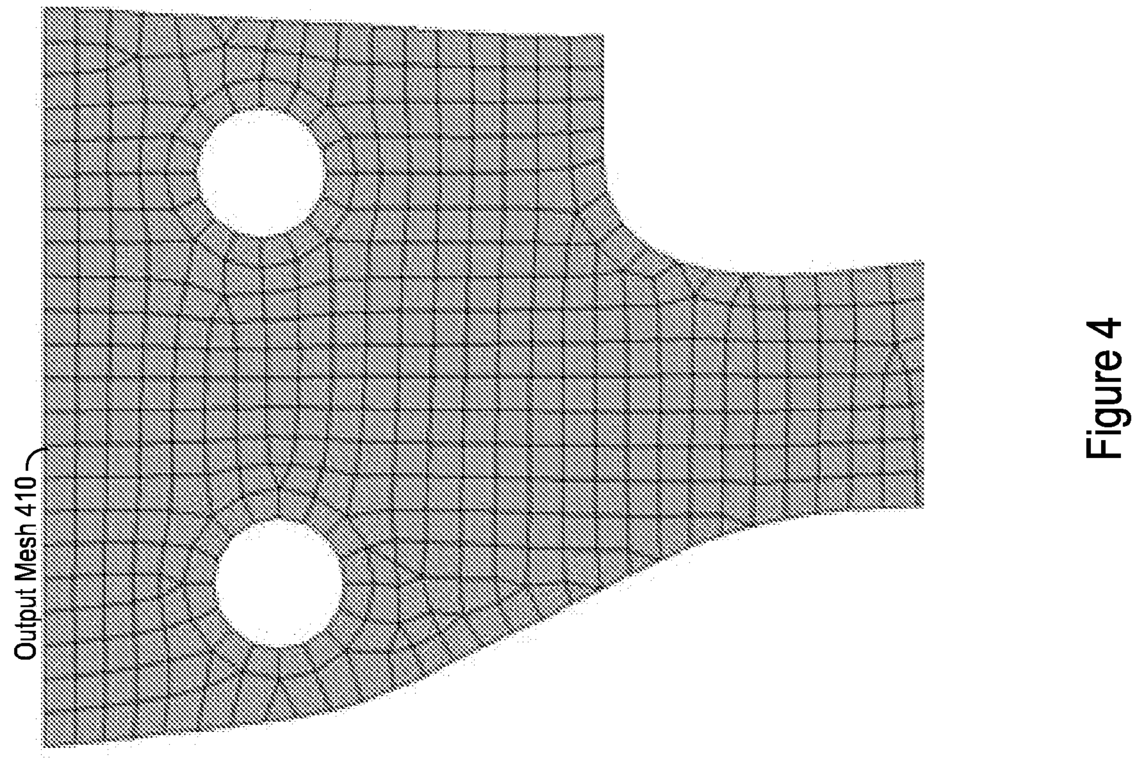
FIG. 4 shows an example of an output mesh that the imprint-based meshing engine may generate via addressing of one or more extended imprint region constraints.

FIG. 4 shows an example of an output mesh 410 that the imprint-based meshing engine 110 may generate via addressing of one or more extended imprint region constraints. In the example of FIG. 4, the imprint-based meshing engine 110 generates the output mesh 410 using the adapted imprint region 320 generated as described herein via truncation. The imprint-based meshing engine 110 may generate the output mesh 410 utilizing any of the imprint-based mesh generation features as described in the '651 application and may thus achieve any combination of the technical benefits of the '651 application.

Additionally, through truncation of an imprint region to form the adjusted imprint region 320, the imprint-based meshing engine 110 may increase the quality of the output mesh 410 by supporting localized meshing within the adjusted imprint region 320, but also via constructing the adjusted imprint region 320 to reduce or remove low-quality mesh elements may otherwise arise from sharp corners, loss of rectangularity, or other imprinting defects that can result without the truncation features described herein.

As yet another example of constraints that the imprint-based meshing engine 110 may identify and process, the constraint-driven imprint-based mesh generation technology of the present disclosure may address constraints in the form of defined imprint regions that overlap with one another. Such a constraint may be referred to as an overlapping imprint region constraint, and example features by which the imprint based meshing engine 110 may address overlapping imprint region constraints are described in greater detail next with reference to FIGS. 5 and 6.

Figure 5:
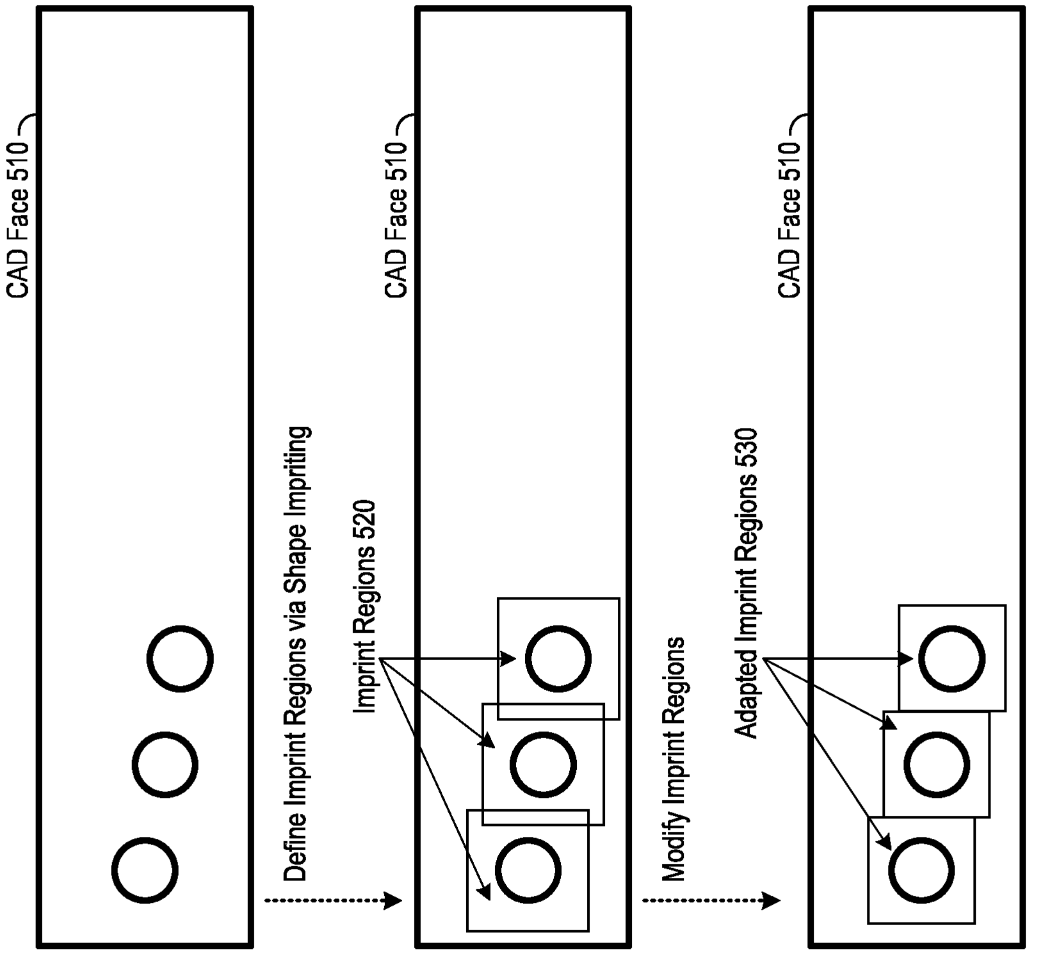
FIG. 5 shows an example imprint region size reduction that the imprint-based meshing engine 110 may perform to address overlapping imprint region constraints.

FIG. 5 shows an example imprint region size reduction that the imprint-based meshing engine 110 may perform to address overlapping imprint region constraints. In the example of FIG. 5, the imprint-based meshing engine 110 defines imprint regions for a CAD face 510. The CAD face 510 shown in FIG. 5 includes internal features shown as three holes, e.g., interior circular edges that define the holes of the CAD face 510. In support of imprint-based mesh generation, the imprint-based meshing engine 110 may define imprint regions as a box-with-hole type, e.g., in any of the ways described in the '651 application, including the imprint regions 520 shown in FIG. 5.

The imprint-based meshing engine 110 may identify an overlapping imprint region constraint for the CAD face 510, doing so by determining that the imprint regions 520 defined for the CAD face 510 meets constraint criteria in which an imprint region overlaps with a different imprint region defined for the CAD face 510. Responsive to such a determination, the imprint-based meshing engine 110 may modify the imprint regions 520 into an adapted imprint region in order to order to address the overlapping imprint region constraint. Modifying the imprint regions 520 to form adapted imprint regions may include reducing the size of the imprint regions 520, e.g., doing so such the imprint regions 520 are reduced in size such that they no longer intersect with one another. An example of adapted imprint regions modified to address an overlapping imprint region constraint is shown in FIG. 5 through the adapted imprint regions 530.

In some implementations, the imprint-based meshing engine 110 may iteratively reduce the size of the imprint regions 520 until some or all overlap between imprint regions is removed. In support of such size reductions, the imprint-based meshing engine 110 may track a status of imprint region-to-imprint region intersections (e.g., box-to-box intersections). Any suitable data structure or tracking technique may be employed by the imprint-based meshing engine 110 to monitor intersection statuses (e.g., as updated each iteration). In some instances, the imprint-based meshing engine 110 may track box-loop intersections for a CAD face through construction of an intersection-status matrix. The imprint-based meshing engine 110 may construct such an intersection matrix (referred to herein as $B_{ij}$) as an N×N symmetric positive definite matrix made up by Boolean entries ('0' or '1' values). A matrix entry value of '0' may indicate no intersection between imprint regions whereas a matrix entry value of '1' may indicate an intersection. For example, if $B_{12}$='1', this may indicate that imprint $\text{region}_1$ intersects with imprint $\text{region}_2$. According to the property of symmetry $B_{12}=B_{21}$, i.e., in this case imprint $\text{region}_2$ also intersects with imprint $\text{region}_1$. In some implementations, the imprint-based meshing engine 110 may additionally track extended imprint region constraints via the intersection matrix (or any other suitable data structure), e.g., by flagging any imprint region that extends beyond an exterior boundary (e.g., outer loop) of the CAD face.

To iteratively reduce the size of imprint regions that overlap with one or more other imprint regions, the imprint-based meshing engine 110 may progressively and incrementally shrink the size of the imprint region, which may include reducing of template mesh elements for the imprinted shape as well as other contraction components of the imprint region. Such reduction may continue until intersection with neighboring imprint regions ceases or until another stopping criteria is reached. Examples of contraction parameters and contraction components that the imprint-based meshing engine 110 may reduce in such size reduction processes are described next with reference to FIG. 6.

Figure 6:
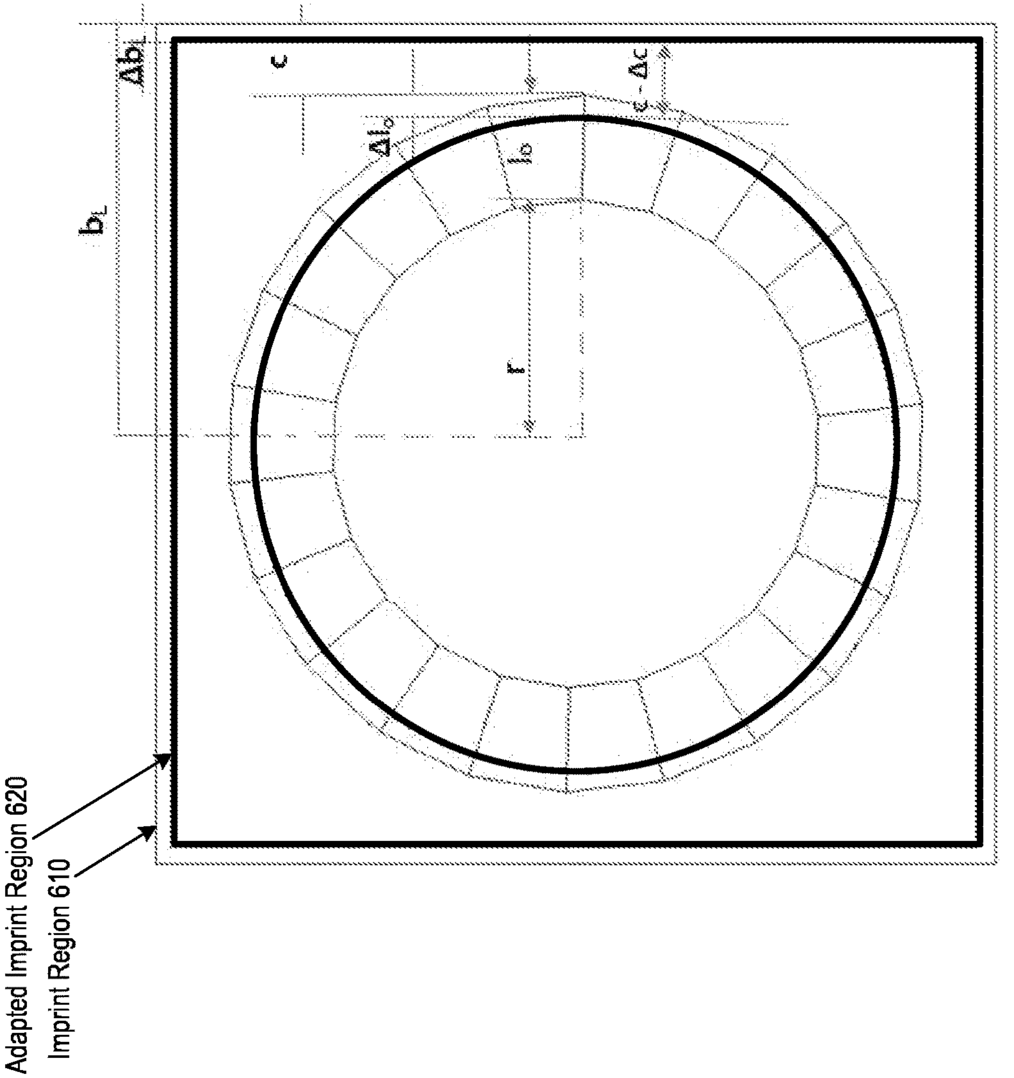
FIG. 6 shows an example size reduction iteration that the imprint-based meshing engine 110 may apply to an imprint region.

FIG. 6 shows an example size reduction iteration that the imprint-based meshing engine 110 may apply to an imprint region. In the example of FIG. 6, the imprint-based meshing engine 110 may reduce the size of an imprint region 610 to form an adapted imprint region 620. The example in FIG. 6 may illustrate one iteration of a size reduction process to address overlapping imprint region constraints for a CAD face, and the imprint-based meshing engine 110 may continue to iteratively reduce the size of the adapted imprint region 620 until stopping criteria are reached. The stopping criteria may include when an adapted imprint region formed from the imprint region 610 no longer intersects any other imprint regions on a CAD face or when mesh elements in the adapted imprint region are equal to a minimum mesh element dimension.

In FIG. 6, various contraction parameters are illustrated that the imprint-based meshing engine 110 may utilize and adjust for each size reduction iteration. As the size of an imprint region is reduced, components of the imprint region (e.g., a mesh template for a corresponding imprinted virtual face) may likewise be reduced. As such, reduction of the imprint region 610 may not be as simple as indiscriminately reducing the size of the imprint region 610 until no intersections to other imprint regions are detected. In particular, the imprint-based meshing engine 110 may account for a number imprint regions in a CAD face to perform size reductions for as well as various other contraction parameters.

In some implementations, the imprint-based meshing engine 110 may represent an intersection clearance process to reduce the size of imprint regions to address overlapping imprint region constraints via the following equation family:

$$\Delta b_{hL} = r_h + \Delta l_{ho} + k_f \cdot \Delta c_h \tag{a}$$

$$\Delta l_{ho} \leq l_{ho} - d_{mel} \tag{b}$$

$$\Delta c_h \leq c_h - d_{mel} \text{ until } B_{hi} = B_{ih} = 0 \forall\, i\, (0,\ n-1) \tag{c}$$

In this example, n may represent the number of imprint regions on a CAD face (or subset thereof that are subject to overlapping imprint region constraints), h may represent a current imprint region under consideration, $b_L$ may represent a half-length of the imprint region, c may represent a clearance length from an outer paver ring of the imprint region to an edge boundary of the imprint region, r may represent a radius value of the hole, $d_{mel}$ may represent a minimum mesh element length for meshing the CAD face, $l_o$ may represent the paver ring offset for an adapted (e.g., reduced) imprint region of a given iteration (e.g., the adapted imprint region 620 in FIG. 6) and $l_{ho}$ may represent the paver ring offset for the adapted imprint region of a current imprint region under consideration, $\Delta l_0$ may represent a variation in the paver ring offset between the current imprint region under consideration and the adapted (e.g., reduced) imprint region for the given iteration, $\Delta c$ may represent a difference in the clearance length c between the current imprint region under consideration and the adapted (e.g., reduced) imprint region for the given iteration, $\Delta b_L$ may represent the difference in half-length values, and $k_f$ may represent a configurable factor value that can be set for various box-with-hole template meshes.

The imprint-based meshing engine 110 may utilize equation (a) above to express or represent, for a current imprint region under consideration h (or the hole thereof), the variation $\Delta b_{hL}$ in the half-length value for a given size reduction iteration in terms of the radius of the hole $r_h$, the variation $\Delta l_{ho}$ in the paver ring offset between the current imprint region under consideration and the adapted (e.g., reduced) imprint region for the given iteration, and $\Delta c_h$ difference in the clearance length c between the current imprint region under consideration and the adapted (e.g., reduced) imprint region for the given iteration. The imprint-based meshing engine 110 may utilize equations (b) and (c) above to express or represent how the paver ring offset $l_{ho}$ and the clearance length $c_h$ can be made to vary (shrink) such that these values are not modified lower than the smallest allowable mesh element length, $d_{mel}$.

By iteratively solving equations (a), (b), and (c) above, the imprint-based meshing engine 110 may progressively modify (e.g., shrink) imprint regions until the stopping criteria are reached. The imprint-based meshing engine 110 may solve the equations iteratively, for example using a Gauss-Seidel solution scheme or any other suitable technique. After shrinking the imprint region in each iteration, the imprint-based meshing engine 110 may check the intersection of imprint regions in a CAD face. Stopping criteria may be reached for a given imprint region when it no longer intersects with any other imprint regions on the CAD face or the imprint region can no longer be reduced in size without violating minimum mesh element length requirements. When all imprint regions of a CAD face have satisfied the stopping criteria (e.g., if the matrix $B_{ij}$ becomes null matrix (all members are zero)), then the imprint-based meshing engine may determine that imprint regions are clear of intersection or otherwise unable to be shrunk more.

For imprint regions that still intersect while being reduced in size up to a minimum mesh element length, the imprint-based meshing engine 110 may determine to drop, discard, or remove such imprint regions. As such, the iterative size reduction processes performed by the imprint-based meshing engine 110 may result, in some instances, in a hybrid output. Such a hybrid output may include intersecting imprint regions of a CAD face that are reduced in size into an adapted imprint region to no long intersect with other imprint regions and some previously defined imprint regions that are removed entirely from the CAD face (and thus forming part of the remainder region of a CAD face).

In any of the ways described herein, the imprint-based meshing engine 110 may address overlapping imprint region constraints through iterative size reduction of imprint regions. In some implementations, the imprint-based meshing engine 110 may address extended imprint region constraints and overlapping imprint region constraints in combination. For instance, the imprint-based meshing engine 110 may first iteratively reduce the size of any intersecting imprint regions and then evaluate any of the adapted imprint regions (shrunk to address overlapping imprint region constraints) extends beyond an outer boundary of the CAD face. If so, the imprint-based meshing engine 110 may then apply any of the truncation techniques described herein to address the identified extended imprint region constraints.

Note that the addressing of overlapping and extended imprint region constraints may require altering the size and geometry of defined imprint regions. Modifying imprint region shapes by either truncating or shrinking box-shapes can affect the mapped paver layer offset in applied mesh templates. Such changes may impact and alter subsequent meshing outputs, and the imprint-based meshing engine 110 may provide user options as to whether to address such constraints that impact paver layer meshing techniques. For example, the imprint-based meshing engine 110 may provide an option to discard or remove any imprint regions subject to overlapping or extended imprint region constraints, e.g., instead of applying the truncation and size reduction features described herein.

Continuing the example constraints addressed by the present disclosure, the constraint-driven imprint-based mesh generation technology of the present disclosure may address constraints in the form of unreliable mesh directions. Mesh directions (also referred to as mesh flow directions) may use a given vector or directional representation to characterize a given CAD face, and thus allow orienting of mesh elements, mesh templates, or other mesh components along a given mesh direction. Example computations and techniques for determining and utilizing mesh directions are described in the '651 application, and the imprint-based meshing engine 110 may apply, support, implement, or perform any such mesh direction-related features.

For example, the imprint-based meshing engine 110 may determine mesh directions based on a minimum-oriented bounding box (MOBB) of a CAD face, e.g., in a 2D parameter space (denoted herein as (u,v)) in which mesh generation is performed. In some implementations, the imprint-based meshing engine 110 may determine or derive a mesh direction for a CAD face from the convex hull of the outer loop (e.g., outer boundary) of a CAD face that is rotated to an optimum position via a rotating caliper method. However, having a single mesh direction characterize an entire CAD face may be reliable or appropriate. For example, CAD faces that are curved in shape may have different face portions in which a mesh direction that characterizes each respective face portion differ from those of other face portions. In such cases, a single mesh direction computed by the imprint-based meshing engine 110 may not accurately or properly characterize various portions of the CAD face and may thus be deemed unreliable.

As described herein, the imprint-based meshing engine 110 may use any number of techniques to quantitatively characterize or determine a mesh direction of a CAD face as unreliable. CAD faces for which the imprint-based meshing engine 110 determines a corresponding mesh direction as unreliable may be subject to unreliable mesh direction constraints, which the constraint-driven imprint-based meshing technology of the present disclosure can address. Example features of addressing such unreliable mesh direction constraints are described next with reference to FIGS. 7 and 8.

Figure 7:
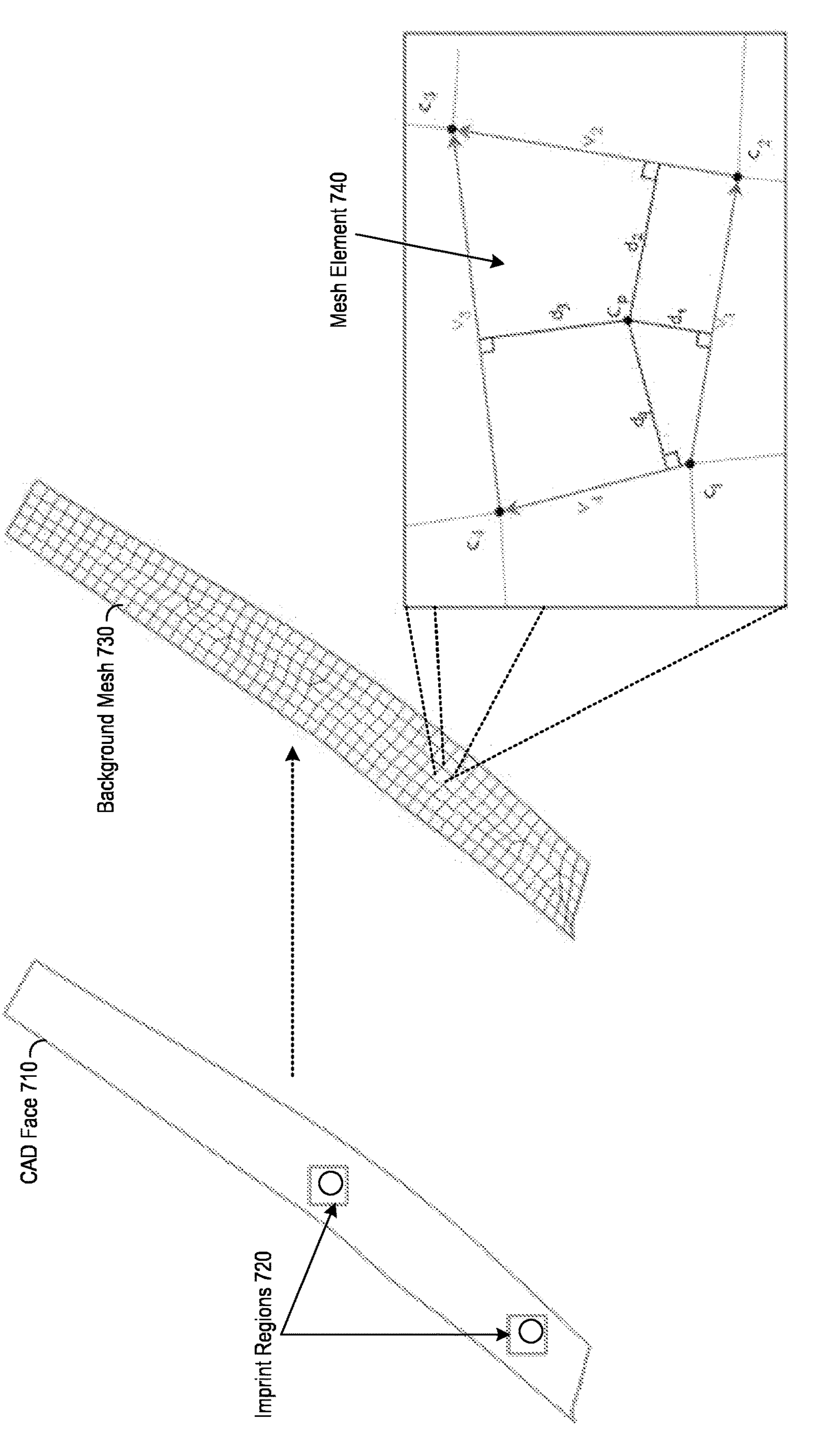
FIG. 7 shows an example generation of a background mesh for a CAD face to address an unreliable mesh direction constraint.

FIG. 7 shows an example generation of a background mesh for a CAD face to address an unreliable mesh direction constraint. In the example of FIG. 7, the imprint-based meshing engine 110 determines that the CAD face 710 meets constraint criteria for an unreliable mesh direction constraint, and the imprint regions 720 defined by the imprint-based meshing engine 110 may be modified accordingly to address the unreliable mesh direction constraint.

The imprint-based meshing engine 110 may characterize a CAD face as subject to an unreliable mesh direction constraint in any number of ways. In particular, the imprint-based meshing engine 110 may designate a CAD face as subject to an unreliable mesh direction constraint via any suitable quantitative computations, e.g., based on a function of an area of the CAD face. In some implementations, the imprint-based meshing engine 110 determines determining that the mesh direction of the CAD face of a CAD object is designated as unreliable by constructing a minimum oriented bounding box in a 2-dimensional parameter space for the CAD face, computing a ratio between an area of the minimum oriented bounding box to the area for the CAD face, and designating the mesh direction of the CAD face as unreliable responsive to a determination that the computed ratio exceeds a predetermined threshold.

To explain further, in orienting the outer boundary (e.g., outer loop) of a CAD face and building a minimum oriented bounding box, the imprint-based meshing engine 110 may measure a degree to which the MOBB aligns with the rotated CAD face. For ratios in which the MOBB area exceeds the area of the oriented CAD face by too much, then that may mean that the CAD face has a curved geometry or other geometric attributes that would render a single mesh direction as inaccurate for characterizing different portions of the CAD face. As such, this single mesh direction to characterize the entire CAD face may be deemed unreliable when the MOBB area is disproportionately higher than the area of the CAD face.

The predetermined threshold that the computed ratio for MOBB area-to-CAD face area need exceed to be designated as unreliable may be configurable, e.g., set by the imprint-based meshing engine 110 to a value of 1.7 or another suitable value. Via such quantitative computations, the imprint-based meshing engine 110 may designate a singular, constant mesh direction for a CAD face as unreliable, and thus subject to an unreliable mesh direction constraint. In some sense, an unreliable mesh direction constraint may indicate that a global mesh direction determined to characterize an entire CAD face is inappropriate to characterize various local portions of the CAD face.

The imprint-based meshing engine 110 may address unreliable mesh direction constraints by locally determining rotation axes by which to orient imprint regions. In the example shown in FIG. 7, the imprint-based meshing engine 110 determines that the CAD face 710 is subject to an unreliable mesh direction constraint, and may thus modify the imprint regions 720 by determining an individual region-specific axis to orient each individual imprint region. The region-specific axis determined for an individual imprint region may be determined from mesh characteristics of mesh elements included within, proximate, or otherwise local to the individual imprint region, thus providing a localized mesh direction determination.

To determine a region-specific axis for an imprint region, the imprint-based meshing engine 110 may construct a feature-suppressed version of the CAD face 710. The imprint-based meshing engine 110 may do so by removing geometric features comprised within the CAD face 710, such as any inner loops (e.g., holes formed by circular edges) or any other features internal to the CAD face 710. Then, the imprint-based meshing engine 110 may generate a background mesh for the feature-suppressed version of the CAD face 710. In the example of FIG. 7, the imprint-based meshing engine 110 suppresses (e.g., removes) the two internal loops (e.g., holes) in the CAD face 710 and generates the background mesh 730 from the feature-suppressed version of the CAD face 710. In some implementations, the imprint-based meshing engine 110 generates the background mesh 730 as a coarse quad-dominant mesh, for example with a majority of quadrilateral mesh elements with 5% (or any other configurable amount) or less triangular mesh elements.

From the background mesh 730, the imprint-based meshing engine 110 may extract frame field vectors. For instance, the imprint-based meshing engine 110 may extract, compute, determine, or otherwise generate frame field vectors for individual mesh elements of the background mesh 730. In some implementations, the imprint-based meshing engine 110 may do so by first generating a bounding box packed field of the CAD face 710 in which bounding boxes are constructed for the individual mesh elements of the background mesh 730. The bound box packed field may be utilized as a local element frame field for computation of frame field vectors.

An example of frame field vector generation is described via the example mesh element 740 shown in FIG. 7. The mesh element 740 is a quadrilateral mesh element of the background mesh 730, and the imprint-based meshing engine 110 may generate a frame field vectors $F_{uie}$ and $F_{vie}$ via the following equations, in which i represents an $i^{th}$ mesh element of a background mesh 730:

$$F_{uie} = \frac{d_3}{(d_1 + d_3)} \cdot v_1 + \frac{d_1}{(d_1 + d_3)} \cdot v_3$$

$$F_{vie} = \frac{d_4}{(d_2 + d_4)} \cdot v_2 + \frac{d_2}{(d_2 + d_4)} \cdot v_4$$

The vectors v and distances d are shown via the example mesh element 740 in FIG. 7. Through these equations, the imprint-based meshing engine 110 may compute a local frame field vector for a centroid $c_p$ of a mesh element (e.g., the mesh element 740 in FIG. 7), doing so in terms of opposite pair edge directions (e.g., $v_1$ and $v_3$) and the perpendicular distances d of each of the mesh element sides/edges from the centroid $c_p$.

For a triangular mesh element, the imprint-based meshing engine 110 may first split the triangular mesh element into three (3) quad elements by joining the three (3) corners of the triangular mesh element to the barycenter of the element. Next, the same vector equations above may be used by the imprint-based meshing engine 110, and the resulting three (3) sets of frame field vectors determined for the split quadrilateral can be averaged out at the barycenter of the triangle to determine the frame field vectors for the barycenter of the triangular mesh element.

In any such manner, the imprint-based meshing engine 110 may generate or otherwise compute frame field vectors for centroids of mesh elements. As such, the imprint-based meshing engine 110 may generate frame field vectors for some or all of the mesh elements that form the background mesh 730. Example of frame field vectors represented on a background mesh are shown in FIG. 8.

Figure 8:
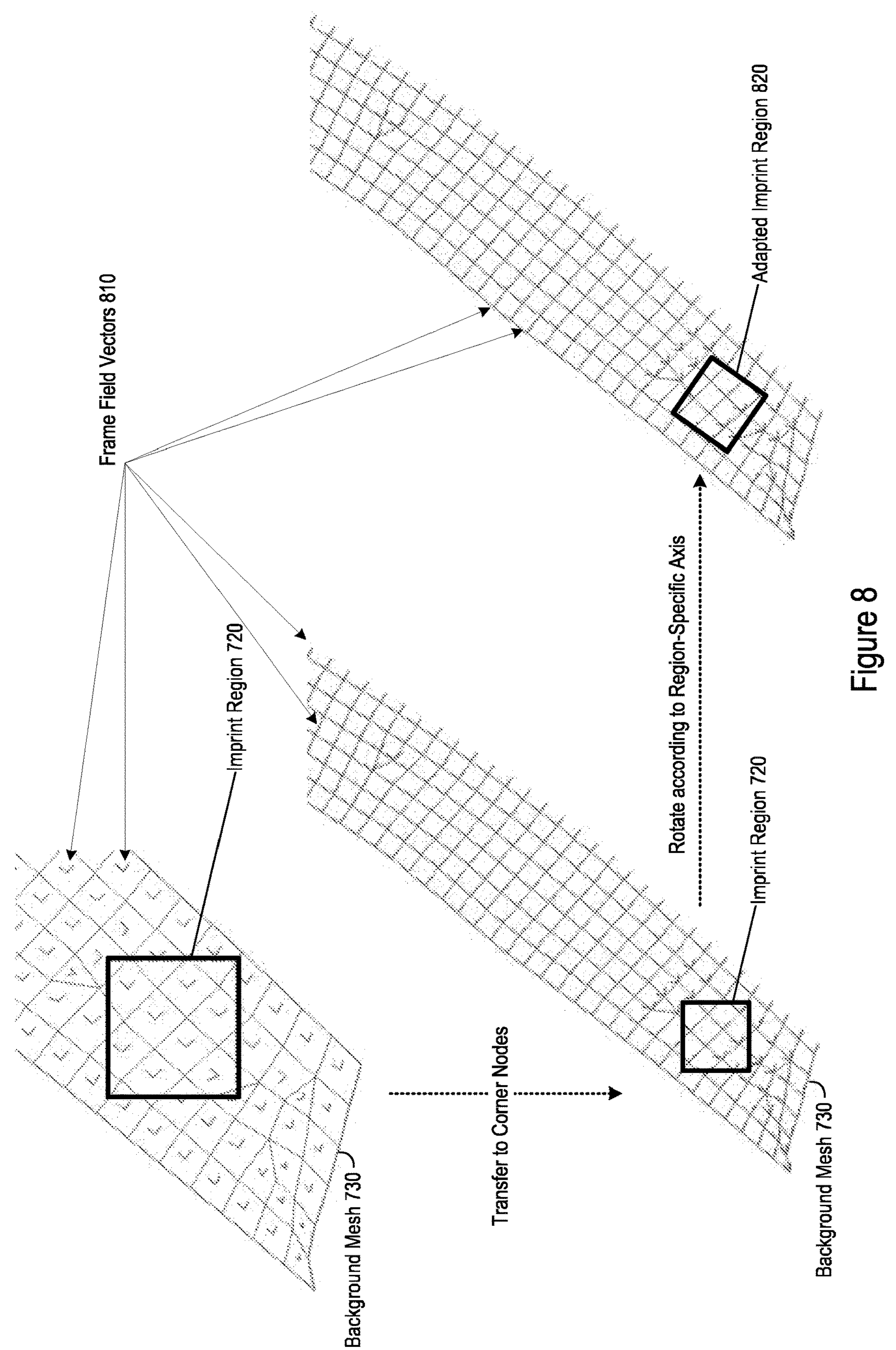
FIG. 8 shows an example determination of region-specific axes to rotate imprint regions from frame field vectors generated from a background mesh.

FIG. 8 shows an example determination of region-specific axes to rotate imprint regions from frame field vectors generated from a background mesh. In the example of FIG. 8, frame field vectors 810 are shown that are computed for various portions of a background mesh 730. In a portion of the background mesh 730 shown in FIG. 8, example frame field vectors are illustrated for the centroid of individual mesh elements of the background mesh 730.

The imprint-based meshing engine 110 may transfer centroid frame field vectors generated for mesh elements to corner nodes of the mesh elements. To do so, the imprint-based meshing engine 110 may generate the corner node frame field vectors as a function of the centroid frame field vectors of each mesh element that the corner node is connected to. In some implementations, the imprint-based meshing engine 110 averages the centroid frame field vectors of each mesh element that a given corner node is connected to in order to determine the corner node frame field vectors for the given corner node. An example of corner node frame field vectors represented on a background mesh 370 is also shown in FIG. 7, in which various frame field vectors are illustrated at corners of the background mesh 730.

From the corner node frame field vectors, the centroid frame field vectors, or a combination of both, the imprint-based meshing engine 110 may construct a frame field to represent or compute frame field vectors for any point in the background mesh 730. As one example, the imprint-based meshing engine 110 may utilize the following equation to construct the frame field:

$$v_i = [\cos(i\theta), \sin(i\theta)]^T \quad \theta = \frac{\pi}{2} \quad 0 \leq i \leq 3$$

The imprint-based meshing engine 110 may solve this equation via a length-weighted Laplace smoother, or any other suitable solving technique. As such, the imprint-based meshing engine 110 may construct a frame field (also referred to as a global frame field vector field) for the background mesh 730. Through such a frame field or the underlying frame field vectors represented within the frame field, the imprint-based meshing engine 110 may determine a respective region-specific axis for each individual imprint region 720 in the CAD face 710.

In some examples, the imprint-based meshing engine 110 determines the region-specific axis as a function of the frame field vectors 810 of one or more of mesh elements of the background mesh 730 that the imprint region 720 overlaps with. For instance, for the mesh elements of the background mesh 730 that overlap with an area of a given imprint region 720, the imprint-based meshing engine 110 may determine the region-specific axis for this given imprint region as an average of the corner node frame field vectors included in these overlapping mesh elements. Since the frame field can generate frame field vectors for any point in the background mesh 730, another implementation may be that the imprint-based meshing engine 110 determines the region-specific axis as a function (e.g., average) of the frame field vectors of every point inside the imprint region 720, a random sampling of a selected number of points in the imprint region 720, the frame field vectors for the corner points of the imprint region 720, or via any other configurable selection of points and corresponding frame field vectors.

Then, the imprint-based meshing engine 110 may modify the imprint region 720 by orienting or rotating the imprint region 720 to align with the determined region-specific axis for the imprint region 720. This rotated imprint region (oriented along the region-specific axis) may be the adapted imprint region 820 that the imprint-based meshing engine 110 generates to address the unreliable mesh direction constraint that the CAD face 710 is subject to. As noted herein, the adapted imprint regions generated to address unreliable mesh direction constraints may be individually and locally constructed for each individual imprint region of a CAD face. As such, the region-specific axis determined for a given imprint region may differ from a region-specific axis determined for a different imprint region defined for the same CAD face.

Figure 9:
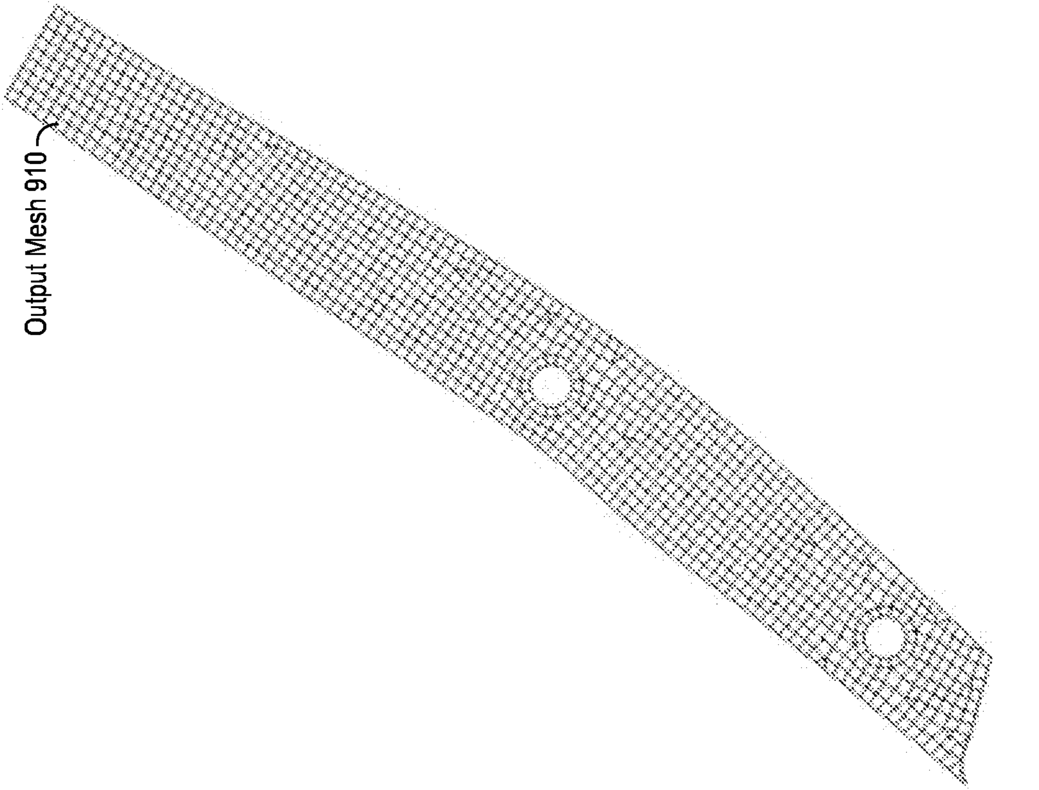
FIG. 9 shows an example of an output mesh that the imprint-based meshing engine may generate via addressing one or more unreliable mesh direction constraints.

FIG. 9 shows an example of an output mesh 910 that the imprint-based meshing engine may generate via addressing one or more unreliable mesh direction constraints. As the imprint-based meshing engine 110 may individually orient different imprint regions of the CAD face, the output mesh 910 generated for such a CAD face may be of higher quality as compared to orienting each imprint region with global mesh direction.

While many imprint-based meshing features have been described herein through illustrative examples presented through various figures, the CAD face access engine 108 or the imprint-based meshing engine 110 may implement any combination of the constraint-driven imprint-based meshing technology described herein and including any imprint-based meshing features of the '651 application.

Figure 10:
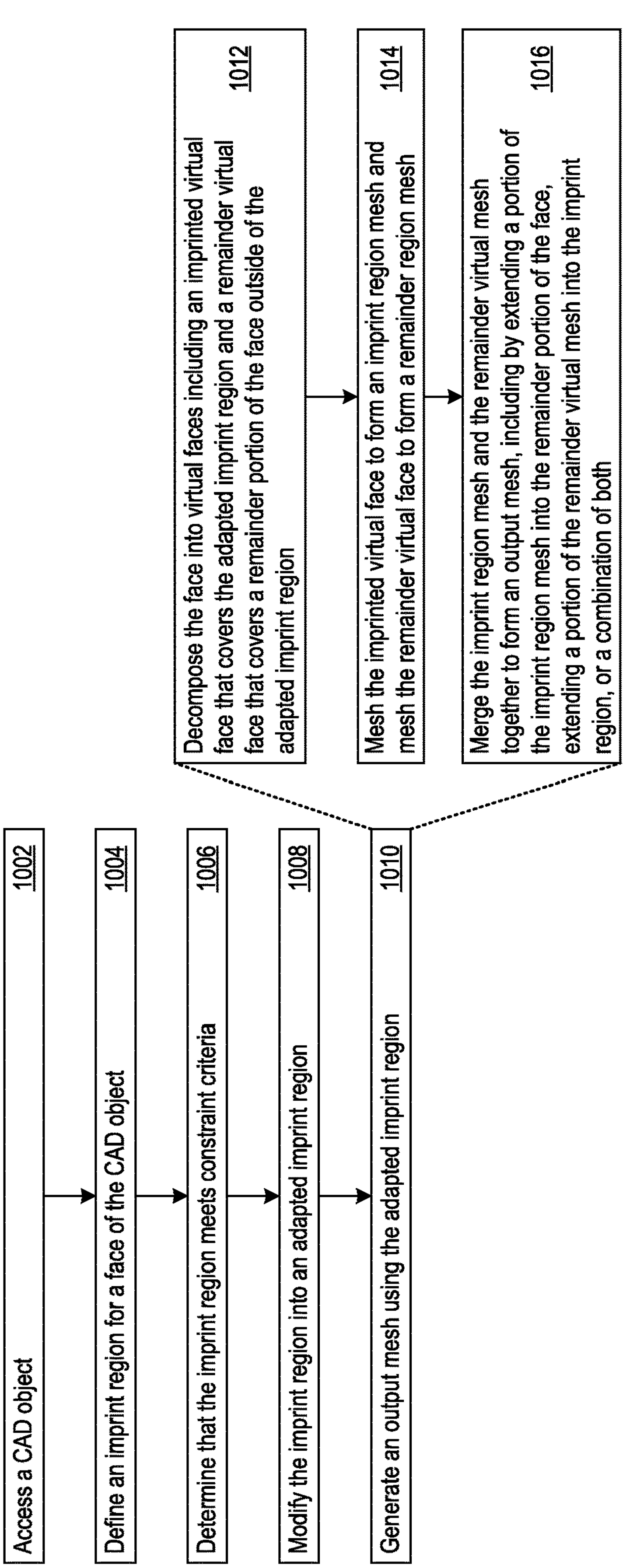
FIG. 10 shows an example of logic that computing system may implement to support constraint-driven imprint-based mesh generation.

FIG. 10 shows an example of logic 1000 that a system may implement to support constraint-driven imprint-based mesh generation. For example, the computing system 100 may implement the logic 1000 as hardware, executable instructions stored on a machine-readable medium, or as a combination of both. The computing system 100 may implement the logic 1000 via the CAD face access engine 108 and the imprint-based meshing engine 110, through which the computing system 100 may perform or execute the logic 1000 as a method to provide any combination of the imprint-based meshing features presented herein. The following description of the logic 1000 is provided using the CAD face access engine 108 and the imprint-based meshing engine 110 as examples. However, various other implementation options by computing systems are possible.

In implementing the logic 1000, the CAD face access engine 108 may access a CAD object (1002). In implementing the logic 1000, the imprint-based meshing engine 110 may define an imprint region for a face of the CAD object (1004) and determine that the imprint region meets constraint criteria (1006). The constraint criteria may define specific constraints that the imprint-based meshing engine 110 may specifically address in support of imprint-based mesh generations. As examples, the constraint criteria may be met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof.

In implementing the logic 1000, responsive to a determination that the imprint region meets the constraint criteria, the imprint-based meshing engine 110 may modify the imprint region into an adapted imprint region (1008) and generate an output mesh using the adapted imprint region (1010). For example, the imprint-based meshing engine 110 may generate the output mesh by decomposing the face of the CAD object into virtual faces, including an imprinted virtual face that covers the adapted imprint region and a remainder virtual face that covers a remainder portion of the face outside of the adapted imprint region (1012), meshing the imprinted virtual face to form an imprint region mesh and meshing the remainder virtual face to form a remainder region mesh (1014), and merging the imprint region mesh and the remainder region mesh together to form the output mesh (1016).

The logic 1000 shown in FIG. 10 provides an illustrative example by which a computing system 100 may support constraint-driven imprint-based meshing according to the present disclosure. Additional or alternative steps in the logic 1000 are contemplated herein, including according to any of the various features described herein for the CAD face access engine 108, the imprint-based meshing engine 110, or any combinations thereof.

Figure 11:
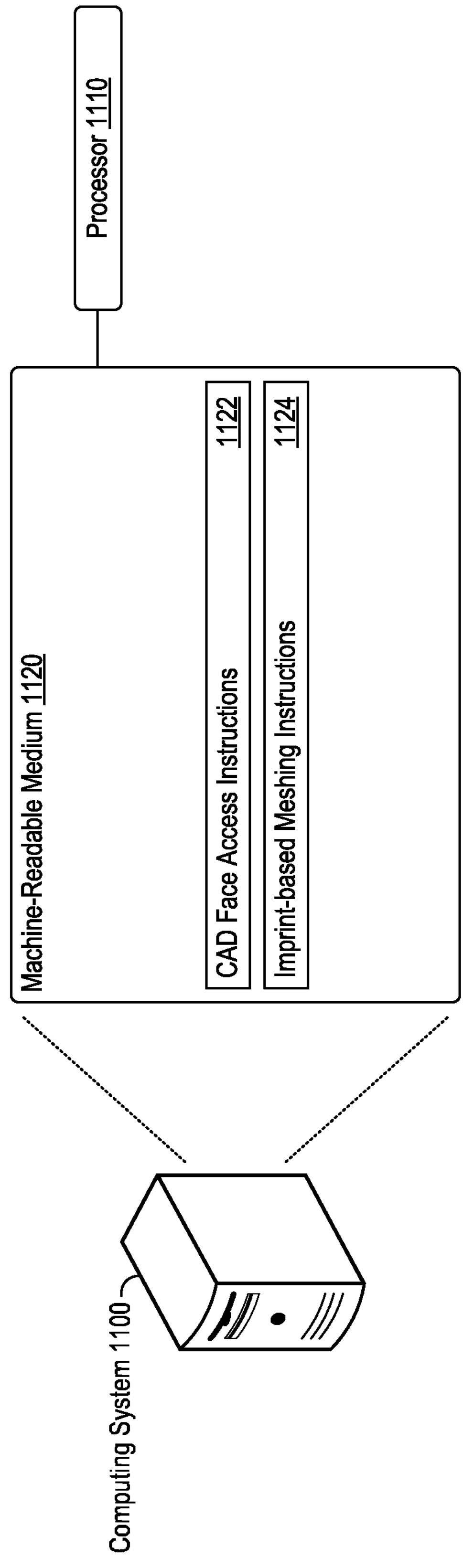
FIG. 11 shows an example of a computing system that supports constraint-driven imprint-based mesh generation.

FIG. 11 shows an example of a computing system 1100 that supports constraint-driven imprint-based mesh generation. The computing system 1100 may include a processor 1110, which may take the form of a single or multiple processors. The processor(s) 1110 may include a central processing unit (CPU), microprocessor, or any hardware device suitable for executing instructions stored on a machine-readable medium. The computing system 1100 may include a machine-readable medium 1120. The machine-readable medium 1120 may take the form of any non-transitory electronic, magnetic, optical, or other physical storage device that stores executable instructions, such as the CAD face access instructions 1122 and the constraint-driven imprint-based meshing instructions 1124 shown in FIG. 11. As such, the machine-readable medium 1120 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 1100 may execute instructions stored on the machine-readable medium 1120 through the processor 1110. Executing the instructions (e.g., the CAD face access instructions 1122 and/or the constraint-driven imprint-based meshing instructions 1124) may cause the computing system 1100 to perform any aspect of the constraint-driven imprint-based mesh generation technology described herein, including according to any of the features of the CAD face access engine 108, the imprint-based meshing engine 110, or combinations of both.

For example, execution of the CAD face access instructions 1122 by the processor 1110 may cause the computing system 1100 to access a CAD object. Execution of the constraint-driven imprint-based meshing instructions 1124 by the processor 1110 may cause the computing system 1100 to define an imprint region for a face of the CAD object and determine that the imprint region meets constraint criteria. As examples, the constraint criteria may be met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof.

Execution of the constraint-driven imprint-based meshing instructions 1124 by the processor 1110 may further cause the computing system 1100 to, responsive to a determination that the imprint region meets the constraint criteria, modify the imprint region into an adapted imprint region and generate an output mesh using the adapted imprint region, including by decomposing the face of the CAD object into virtual faces, including an imprinted virtual face that covers the adapted imprint region and a remainder virtual face that covers a remainder portion of the face outside of the adapted imprint region, meshing the imprinted virtual face to form an imprint region mesh and meshing the remainder virtual face to form a remainder region mesh, and merging the imprint region mesh and the remainder region mesh together to form the output mesh.

Any additional or alternative constraint-driven imprint-based meshing features as described herein may be implemented via the CAD face access instructions 1122, imprint-based meshing instructions 1124, or a combination of both.

The systems, methods, devices, and logic described above, including the CAD face access engine 108 and the imprint-based meshing engine 110, may be implemented in many different ways in many different combinations of hardware, logic, circuitry, and executable instructions stored on a machine-readable medium. For example, the CAD face access engine 108, the imprint-based meshing engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the CAD face access engine 108, the imprint-based meshing engine 110, or combinations thereof.

The processing capability of the systems, devices, and engines described herein, including the CAD face access engine 108 and the imprint-based meshing engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:

by a computing system:

accessing a computer-aided design (CAD) object;

defining an imprint region for a face of the CAD object;

determining that the imprint region meets constraint criteria, wherein the constraint criteria are met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof, and wherein determining that the mesh direction of the face of the CAD object is designated as unreliable comprises:

constructing a minimum oriented bounding box in a 2-dimensional parameter space for the face of the CAD object;

computing a ratio between an area of the minimum oriented bounding box to the area for the face of the CAD object; and designating the mesh direction of the face of the CAD object as unreliable responsive to a determination that the computed ratio exceeds a predetermined threshold; and responsive to a determination that the imprint region meets the constraint criteria, modifying the imprint region into an adapted imprint region;

generating an output mesh using the adapted imprint region, including by:

decomposing the face into virtual faces, including an imprinted virtual face that covers the adapted imprint region and a remainder virtual face that covers a remainder portion of the face outside of the adapted imprint region;

meshing the imprinted virtual face to form an imprint region mesh and meshing the remainder virtual face to form a remainder region mesh; and merging the imprint region mesh and the remainder region mesh together to form the output mesh.

2. The method of claim 1, wherein when the imprint region meets the constraint criteria for when the imprint region encloses a circular edge that is connected to another face of the CAD object, modifying the imprint region into the adapted imprint region comprises using the imprint region as the adapted imprint region; and wherein meshing the imprinted virtual face to form the imprint region mesh comprises generating a boundary ring of the imprint region mesh by projecting points of an outer paver ring of the imprint region mesh to orthogonally intersect boundaries of the imprinted virtual face to form mesh elements of the boundary ring of the imprint region mesh.

3. The method of claim 1, wherein when the imprint region meets the constraint criteria for when a portion of the imprint region is outside a boundary of the face of the CAD object, modifying the imprint region into the adapted imprint region comprises truncating the imprint region along the boundary of the face of the CAD object.

4. The method of claim 1, wherein when the imprint region meets the constraint criteria for when the imprint region overlaps with a different imprint region defined for the face of the CAD object, modifying the imprint region into the adapted imprint region comprises iteratively reducing a size of the imprint region, the different imprint region, or a combination of both, until the imprint region and different imprint region no longer overlap with one another.

5. The method of claim 1, wherein when the imprint region meets the constraint criteria for when the mesh direction of the face of the CAD object is designated as unreliable based on a function of an area of the face of the CAD object, modifying the imprint region into the adapted imprint region comprises:

determining region-specific axis to orient the imprint region, including by:

constructing a feature-suppressed version of the face of the CAD object by removing geometric features comprised within the face of the CAD object;

generating a background mesh for the feature-suppressed version of the face of the CAD object;

generating frame field vectors for mesh elements of the background mesh; and determining the region-specific axis as a function of the frame field vectors of one or more of mesh elements of the background mesh that the imprint region overlaps with; and rotating the imprint region according to the region-specific axis to determine the adapted imprint region.

6. The method of claim 5, wherein the region-specific axis determined for the imprint region differs from a region-specific axis determined for a different imprint region defined for the face of the CAD object.

7. A system comprising:

a processor; and a non-transitory machine-readable medium comprising instructions that, when executed by the processor, cause a computing system to:

access a CAD object;

define an imprint region for a face of the CAD object;

determine that the imprint region meets constraint criteria, wherein the constraint criteria are met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof, and wherein the instructions, when executed, cause the computing system to determine that the mesh direction of the face of the CAD object is designated as unreliable by:

constructing a minimum oriented bounding box in a 2-dimensional parameter space for the face of the CAD object;

computing a ratio between an area of the minimum oriented bounding box to the area for the face of the CAD object; and designating the mesh direction of the face of the CAD object as unreliable responsive to a determination that the computed ratio exceeds a predetermined threshold; and responsive to a determination that the imprint region meets the constraint criteria, modify the imprint region into an adapted imprint region;

generate an output mesh using the adapted imprint region, including by:

decomposing the face into virtual faces, including an imprinted virtual face that covers the adapted imprint region and a remainder virtual face that covers a remainder portion of the face outside of the adapted imprint region;

meshing the imprinted virtual face to form an imprint region mesh and meshing the remainder virtual face to form a remainder region mesh; and merging the imprint region mesh and the remainder region mesh together to form the output mesh.

8. The system of claim 7, wherein when the imprint region meets the constraint criteria for when the imprint region encloses a circular edge that is connected to another face of the CAD object, the instructions, when executed, cause the computing system to modify the imprint region into the adapted imprint region by using the imprint region as the adapted imprint region; and wherein the instructions, when executed, cause the computing system to mesh the imprinted virtual face to form the imprint region mesh by generating a boundary ring of the imprint region mesh by projecting points of an outer paver ring of the imprint region mesh to orthogonally intersect boundaries of the imprinted virtual face to form mesh elements of the boundary ring of the imprint region mesh.

9. The system of claim 7, wherein when the imprint region meets the constraint criteria for when a portion of the imprint region is outside a boundary of the face of the CAD object, the instructions, when executed, cause the computing system to modify the imprint region into the adapted imprint region by truncating the imprint region along the boundary of the face of the CAD object.

10. The system of claim 7, wherein when the imprint region meets the constraint criteria for when the imprint region overlaps with a different imprint region defined for the face of the CAD object, the instructions, when executed, cause the computing system to modify the imprint region into the adapted imprint region by iteratively reducing a size of the imprint region, the different imprint region, or a combination of both, until the imprint region and different imprint region no longer overlap with one another.

11. The system of claim 7, wherein when the imprint region meets the constraint criteria for when the mesh direction of the face of the CAD object is designated as unreliable based on a function of an area of the face of the CAD object, the instructions, when executed, cause the computing system to modify the imprint region into the adapted imprint region by:

determining region-specific axis to orient the imprint region, including by:

constructing a feature-suppressed version of the face of the CAD object by removing geometric features comprised within the face of the CAD object;

generating a background mesh for the feature-suppressed version of the face of the CAD object;

generating frame field vectors for mesh elements of the background mesh; and determining the region-specific axis as a function of the frame field vectors of one or more of mesh elements of the background mesh that the imprint region overlaps with; and rotating the imprint region according to the region-specific axis to determine the adapted imprint region.

12. The system of claim 11, wherein the region-specific axis determined for the imprint region differs from a region-specific axis determined for a different imprint region defined for the face of the CAD object.

13. A non-transitory machine-readable medium comprising instructions that, when executed by a processor, cause a computing system to:

access a CAD object;

define an imprint region for a face of the CAD object;

determine that the imprint region meets constraint criteria, wherein the constraint criteria are met when the imprint region encloses a circular edge that is connected to another face of the CAD object, when a portion of the imprint region is outside a boundary of the face of the CAD object, when the imprint region overlaps with a different imprint region defined for the face of the CAD object, when a mesh direction of the face of the CAD object is designated as unreliable based on a function of an area of the face of the CAD object, or any combination thereof, and wherein the instructions, when executed, cause the computing system to determine that the mesh direction of the face of the CAD object is designated as unreliable by:

constructing a minimum oriented bounding box in a 2-dimensional parameter space for the face of the CAD object;

computing a ratio between an area of the minimum oriented bounding box to the area for the face of the CAD object; and designating the mesh direction of the face of the CAD object as unreliable responsive to a determination that the computed ratio exceeds a predetermined threshold; and responsive to a determination that the imprint region meets the constraint criteria, modify the imprint region into an adapted imprint region;

generate an output mesh using the adapted imprint region, including by:

decomposing the face into virtual faces, including an imprinted virtual face that covers the adapted imprint region and a remainder virtual face that covers a remainder portion of the face outside of the adapted imprint region;

meshing the imprinted virtual face to form an imprint region mesh and meshing the remainder virtual face to form a remainder region mesh; and merging the imprint region mesh and the remainder region mesh together to form the output mesh.

14. The non-transitory machine-readable medium of claim 13, wherein when the imprint region meets the constraint criteria for when the imprint region encloses a circular edge that is connected to another face of the CAD object, the instructions, when executed, cause the computing system to modify the imprint region into the adapted imprint region by using the imprint region as the adapted imprint region; and wherein the instructions, when executed, cause the computing system to mesh the imprinted virtual face to form the imprint region mesh by generating a boundary ring of the imprint region mesh by projecting points of an outer paver ring of the imprint region mesh to orthogonally intersect boundaries of the imprinted virtual face to form mesh elements of the boundary ring of the imprint region mesh.

15. The non-transitory machine-readable medium of claim 13, wherein when the imprint region meets the constraint criteria for when a portion of the imprint region is outside a boundary of the face of the CAD object, the instructions, when executed, cause the computing system to modify the imprint region into the adapted imprint region by truncating the imprint region along the boundary of the face of the CAD object.

16. The non-transitory machine-readable medium of claim 13, wherein when the imprint region meets the constraint criteria for when the imprint region overlaps with a different imprint region defined for the face of the CAD object, the instructions, when executed, cause the computing system to modify the imprint region into the adapted imprint region by iteratively reducing a size of the imprint region, the different imprint region, or a combination of both, until the imprint region and different imprint region no longer overlap with one another.

17. The non-transitory machine-readable medium of claim 13, wherein when the imprint region meets the constraint criteria for when the mesh direction of the face of the CAD object is designated as unreliable based on a function of an area of the face of the CAD object, the instructions, when executed, cause the computing system to modify the imprint region into the adapted imprint region by:

determining region-specific axis to orient the imprint region, including by:

constructing a feature-suppressed version of the face of the CAD object by removing geometric features comprised within the face of the CAD object;

generating a background mesh for the feature-suppressed version of the face of the CAD object;

generating frame field vectors for mesh elements of the background mesh; and determining the region-specific axis as a function of the frame field vectors of one or more of mesh elements of the background mesh that the imprint region overlaps with; and rotating the imprint region according to the region-specific axis to determine the adapted imprint region.

18. The non-transitory machine-readable medium of claim 17, wherein the region-specific axis determined for the imprint region differs from a region-specific axis determined for a different imprint region defined for the face of the CAD object.

* * * * *